Inventors
Henry T. Murdock
Stanley N. Ringel
by John P. Hines
Attorney

United States Patent Office 3,345,740
Patented Oct. 10, 1967

3,345,740
METHOD OF WINDING DYNAMOELECTRIC CORES BY USING TWO WINDING HEADS
Henry T. Murdock and Stanley M. Ringel, Cincinnati, Ohio, assignors to Allis-Chalmers Manufacturing Company, Milwaukee, Wis.
Filed Apr. 30, 1965, Ser. No. 452,233
2 Claims. (Cl. 29—596)

This invention relates generally to a method of winding a dynamoelectric machine. More specifically, this invention relates to a method of winding induction type motors and generators intended to be operated from a three phase source of alternating current power. Attempts have been made to develop a suitable winding that can be machine wound directly on the core. Some success has been achieved in using machines to assemble concentric windings on cores. However, the operating characteristics of motors having this type of winding are inferior to the characteristics to be derived from a properly lap wound motor.

Most common varieties of electric motors fundamentally embody the same principle of operation, i.e., the positioning of a current carrying conductor in a magnetic field. The flow of current in the conductor produces magnetic lines of force concentric therewith which react with the magnetic lines of force of the field to produce a physical force tending to move the conductor out of the field. A classic variety of an electric motor for operation from a source of alternating current is the induction motor in which one of the core members, generally the rotor, is provided with a short circuited winding and the other core member, generally the stator, is provided with a field exciting winding. With this arrangement, energization of the field exciting winding from a source of alternating current induces a heavy current flow in the short circuited winding by transformer action. This heavy current flow cooperating with the magnetic flux produced by the field exciting winding provides a rotational force. Mere energization of the field exciting winding from a single phase source of alternating current will not, however, provide the requisite rotational force initially to start an induction motor since the alternating magnetic field and the resultant induced alternating current in the short circuited winding produce alternating equal and opposite rotational forces; a rotating magnetic field must be provided in order to start an induction motor. Such a rotating magnetic field is most conveniently provided by energizing the field exciting winding of the machine from a source of polyphase alternating current, such as the three phase alternating current power commercially supplied by utilities in the United States.

In the case of an induction motor to be energized from a source of polyphase alternating current, the field exciting winding conventionally is divided into a plurality of portions or phases, generally equal in number to the number of phases in the source of polyphase alternating current. In the case of a machine to be operated from a three phase source of alternating current, the field exciting winding conventionally is formed of three phases which may be connected either in Y or Δ across the three phase source. Each phase of the field exciting winding in turn conventionally comprises one or more pairs of sections or "pole groups" each in turn comprising one or more individual coils; the winding sections or pole groups of each phase are disposed on a magnetic core member so as to form the desired number of magnetic poles, e.g., in the case of a four pole motor, each winding phase will comprise four sections or pole groups, with each of the pole groups being formed of one or more individual coils.

A magnetic core member on which the field exciting winding is positioned is, in the case of polyphase induction motors, most commonly the stator member, concentrically surrounding the rotor member and defining an air gap therewith. The stator core member of conventional polyphase alternating current induction motors has a plurality of winding slots extending radially inwardly from its surface which defines the air gap with the rotor member. The slots are usually equally spaced around the air gap defining surface or bore. The coils which form the respective winding phases have their sides disposed in these winding slots, and a machine of this type is customarily referred to as having a "distributed" winding. In the past, polyphase alternating current induction motors have commonly been provided with a so-called "lap" winding. In the lap winding, each coil has a first side disposed in the bottom of a winding slot and second side disposed over the first side of another coil. This over-lapping relationship of the coils proceeds completely around the stator core member until all the coils are in place. Normally, these coils are preformed and then placed into the stator core slots by hand which is a time consuming and expensive operation.

Another form of winding arrangement which has been in common use for many years in single phase alternating current induction motors and which has lately found increasing application in special polyphase alternating current induction motors is the so-called "concentric" winding. In the concentric winding, all of the coils comprising a given pole group are concentrically arranged. Concentric windings lend themselves much more readily than lap windings to machine winding directly into the slots of the stator core member. However, the operating characteristics of the lap wound machine are preferred over the operating characteristics of a concentrically wound machine in most applications.

One of the problems with machine winding motor cores with three phase windings in the past was that the winding machines were complex and required frequent revising or setting and still did not completely solve the problem of lifting the coils to position later wound coils. This is a hand operation and coupled with the complex setting of the winding heads to assure mechanical balance, rendered machine winding of three phase coils impractical.

The motor of this invention incorporates a winding which is both physically symmetrical and electrically balanced. The coils are arranged in the stator in such a manner that the winding can be machine wound directly on to the core. According to the method of this invention, a plurality of coils may be wound simultaneously into the core. This is accomplished by placing individual winding heads a predetermined distance apart to assure physical symmetry between coils and coil groups and then indexing the core relative to the heads in a predetermined sequence to assure both physical symmetry and electrical balance. The coils wound according to this invention have the same number of turns and the same coil pitch. Hence, the motor of this invention is extremely simple, can be easily machine wound and has operating characteristics which are better than a concentrically wound machine and substantially equal to a conventional lap wound machine.

Therefore, it is the object of this invention to provide a new and improved method for winding a dynamoelectric machine.

Another object of this invention is to provide a new and improved method for winding the stator coils of a three phase induction motor.

Another object of this invention is to teach a new and improved method of winding a stator for an induction motor which provides operating characteristics substantially equivalent to the operating characteristics of a conventional lap wound motor.

Other objects and advantages will be apparent from the following description when read in connection with the accompanying drawings, in which.

Figure 1:
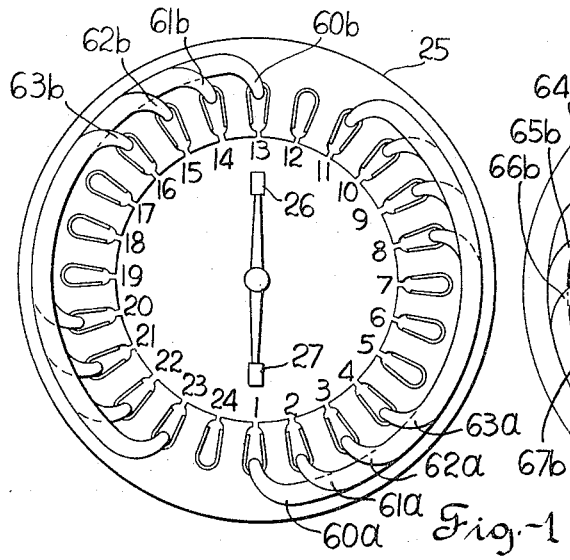
FIG. 1 is a cross sectional view of a stator core of this invention showing the first sets of field coils positioned in the core.

Referring more specifically to the drawing by characters of reference, this invention is illustrated in connection with an induction motor having a twenty-four slot, two pole stator with a one to eight pitch. However, it will be obvious to those familiar with the art that different pitches may be used as well as various slotting combinations and number of poles.

The winding of this invention will be explained in detail in connection with a standard three-phase machine but would be applicable to a motor utilizing any polyphase winding system. Since we are discussing a three phase motor, the winding of this invention would be particularly applicable in connection with cores in which the number of winding slots is a multiple of six. Preferably, each individual coil of the winding is the same pitch and has substantially the same number of turns. In this case each coil is shown as spanning seven teeth.

The winding of this invention is particularly adaptable to be wound directly on the core by a winding machine. Hence, the winding will be described as if it were to be machine wound on the core by a machine having two distinct winding heads 26 and 27 positioned 180° apart. Each winding head winds separate and distinct coils simultaneously with the winding of coils by the other head. The coils electrically provide the desired number of poles and operating characteristics. To further simplify the description of the winding operation and assembly in connection with the first embodiment, the coils wound at the same time will be identified with the same coil number with an added letter to distinguish it from the other simultaneously wound coils. It is, of course, understood that each of the individual coils has appropriate coil ends extending therefrom which can be interconnected with other coils in the machine to form the desired electrical connections which determine the voltage at which the motor will be run, the type of connection, the number of poles and the like.

Figure 2:
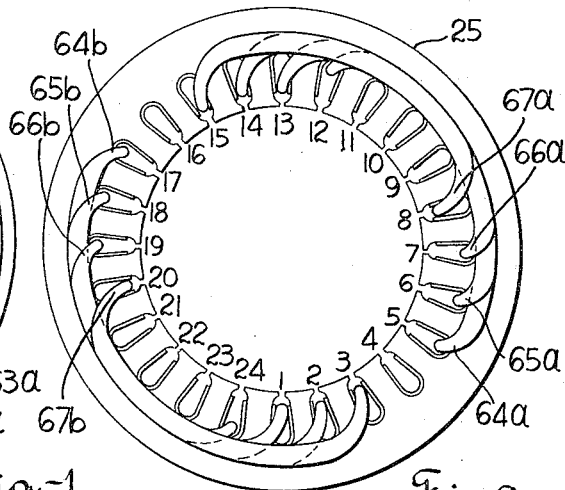
FIGS. 2 and 3 are cross sectional views of the stator of this invention showing progressively the various sets of coils being positioned in the stator.
Figure 3:
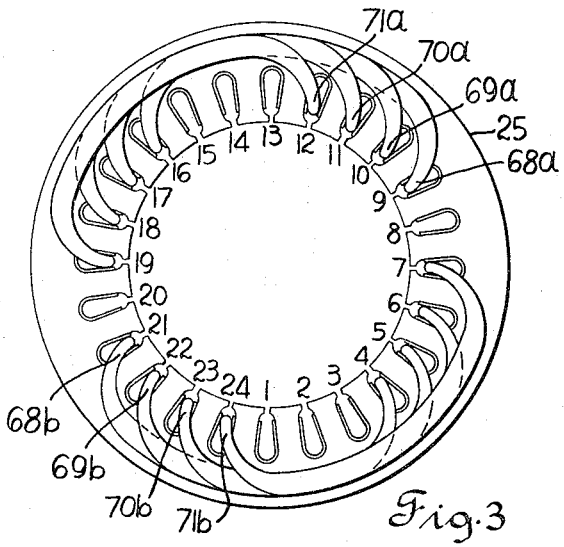
Figure 4:
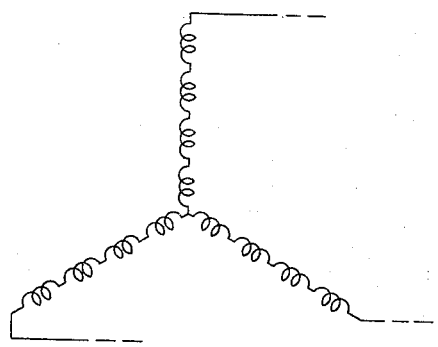
FIG. 4 is a diagrammatic view showing how the coils are connected to form a common Y connection.

The sequence of winding and positioning the coils in the stator core is illustrated in steps in FIGS. 1 through 3 and a schematic diagram in FIG. 4 illustrates the coils connected in a Y connection.

The core 25 is mounted in an appropriate vise and the winding heads 26 and 27 (shown only in FIG. 1) of the machine are positioned within the bore of the core 180° apart and are initially positioned to wind coils 60a and b in slots 1–8 and 13–20, respectively. When these coils have been wound, the machine is indexed to position the winding heads to wind a coil in the next adjacent set of slots. This can be done by rotating either the winding heads or the core, but in the preferred operation, because of the complexity of the winding heads, the core is rotated in a clockwise direction through an angle equal to the angle between the center lines of adjacent slots. Then the coils 61a and b are wound into slots 2–9 and 14–21. The core again is rotated in a clockwise direction and coils 62a and b are wound in slots 3–10 and 15–22 respectively. In like manner coils 63a and b are wound in slots 4–11 and 16–23 respectively. All of the coils 60 through 63 have both sides located in the bottoms of their respective slots and are referred to as being wound bottom to bottom. This completes the winding of the first group of coils and suitable phase insulation is positioned on top of the portions of the coils extending beyond the ends of the core.

The core is then indexed one notch as explained above and the second group of coils are wound into the appropriate winding slots. This consists of coils 64, 65, 66 and 67. First coils 64a and b are wound in slots 5–12 and 17–24 respectively. These coils are wound bottom to bottom. The core is then indexed and the coils 65a and b are wound in slots 6–13 and 18–1 respectively. It is noted here that these coils 65a and b have their first side, that is the side in slots 6 and 18 formed in the bottom of the winding slots whereas the other side of the coils is formed in the top of the slots 13 and 1 over the sides of previous wound coils 60. In like manner coils 66a and b are wound bottom to top in slots 7–14 and 19–2 respectively. After the core is again indexed one slot, coils 67a and b are wound. These coils are wound top to top in slots 8–15 and 20–3 respectively. This completes the winding of the second group of coils and suitable insulation paper is again placed over the portions of the coils 64, 65, 66 and 67 that extend beyond the ends of the core.

The next coil group consisting of coils 68, 69, 70 and 71 are now ready to be wound. Again the core is indexed one notch and the coils 68a and b positioned in slots 9–16 and 21–4 respectively. Again it is noted that with these coils the sides are wound top to top. The core is then progressively indexed until the remaining coils 69, 70 and 71 both a and b are wound into the slots as shown in FIG. 3. It is noted here that all the coils 69, 70 and 71 have both sides positioned in the top of the respective winding slots because the bottom portions of these slots have already been filled wtih previously wound coils. This completes the winding operation and again suitable insulating material is positioned over the portions of the coils in this group which extend beyond the end of the core.

As was mentioned earlier, the coils are connected to other coils in their group which have leads extending therefrom. These groups of coils are then connected into their proper phases and connected to a source of electricity to form the desired number of poles and to balance the motor electrically.

It should be noted that each of the coils have exactly the same coil pitch. That is, it extends from one slot to another eight slots away and hence spans a total of seven teeth. Also, all the coils have substantially the same number of turns, and hence all of the coils of the machine can be wound into the stator without changing the setting on the winding head of the machine. Since the cores were wound simultaneously by heads 180° apart, each phase winding has the same number of coils bottom to bottom, top to top and bottom to top and hence, is precisely positioned physically relative to each other so as to form a perfect mechanical balance. The wires are hooked up to direct the current through the coils in the proper sequence to form a three phase winding having the desired number of poles and automatically, electrically balance the winding. Hence, the machine can be completely machine wound and have a three phase winding that is mechanically and electrically balanced.

Figure 5:
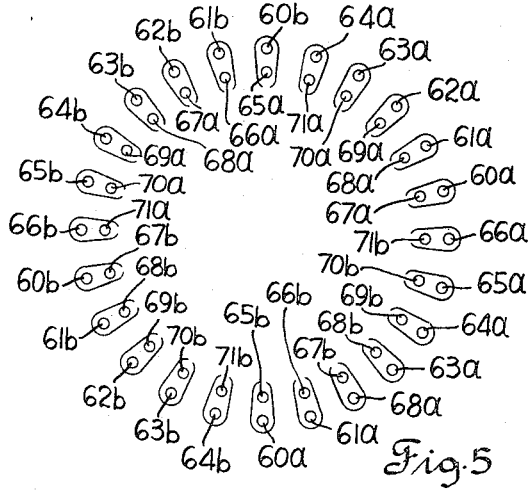
FIG. 5 is a diagrammatic view of the stator core of this invention showing the location of the various coils in the winding slots of the stator core.

The illustration in FIG. 5 clearly illustrates the location of each side of each coil in its respective slot and FIG. 4 illustrates a schematic diagram connecting the various coils in each phase.

There are a large number of variations of windings that can be wound by the method of this invention. Since the windings are wound by two heads simultaneously forming coils 180° apart, the coil pitches can be chosen relative to the number of slots in the core to produce a winding that is inherently mechanically and electrically balanced. Furthermore, a balanced lap winding can be formed without lifting any previously wound coils to place other coils beneath them in the slots.

From the above, it can be seen that because the three phase winding is formed by two winding heads operating simultaneously, the winding can be automatically mechanically balanced. By choosing the proper coil pitch and indexing, an electrically and mechanically balanced lap winding can be formed without lifting any coil from the core to place another coil. Hence, winding according to the method of the invention is almost completely automatic machine winding.

Although but one embodiment has been illustrated and described, it will be apparent to those skilled in the art that various modifications and changes can be made therein without departing from the spirit of the invention or the scope of the appended claims.

The embodiments of the invention in which an exclusive property or privilege is claimed are defined as follows:

1. The method of winding a three phase, two pole winding in the core of a dynamoelectric machine having twenty-four winding slots opening to the bore of the core comprising the steps of: (a) placing two winding heads 180° apart adjacent winding slots in said core; (b) winding two coils simultaneously with both sides of each coil in the bottom of the slots; (c) indexing said core one step by rotating said core clockwise through an angle equal to the angle between the center lines of adjacent winding slots to position said heads opposite the next winding slots; (d) winding two more coils simultaneously with both sides of the coils positioned in the bottom of the slots; repeating steps (c) and (d) two more times; (f) applying phase insulation to the portion of the coils extending beyond the ends of the core; (g) indexing said core clockwise one step; (h) winding two coils simultaneously with both sides of each coil in the bottom of the slots; (i) indexing the core clockwise one step; (j) winding two coils simultaneously with one side of each coil in the bottom of each slot and the other side in the top of a slot positioned over one of said previously wound coils; (k) repeating steps (i) and (j) one time; (l) indexing the core clockwise one step; (m) winding two coils simultaneously with both sides of each coil in the top of a slot over a previously wound coil to form a second group of coils; (n) insulating the portions of the coils in said second group extending beyond the ends of said core; (o) indexing said core one step; (p) winding two coils simultaneously with both sides of the coils in the top of a slot over a previously wound coil; (q) repeating steps (o) and (p) three more times to form a third group of coils; (r) insulating the portions of the coils in said third group that extend beyond the ends of the core; (s) interconnecting the coils electrically to provide an electrically balanced three phase, two pole winding.

2. A method of winding a three phase winding in the core of a dynamoelectric machine having a total number of winding slots exceeding three and equally divisible by two and three comprising the steps of: (a) placing two winding heads 180° apart adjacent winding slots in said core; (b) winding two coils simultaneously until said slots are substantially one-half full of coil sides with both sides of each coil in the bottom of the slots; (c) indexing said core in one direction through an angle equal to the angle between adjacent slots of said core; (d) repeating steps (b) and (c) until two-thirds of said slots have coil sides therein; (e) indexing said core in said direction through an angle equal to the angle between adjacent slots of said core; (f) winding two coils simultaneously with one side of each coil in the bottom of a slot and the other side of each coil in the top of a slot positioned over one of said previously wound coil sides; (g) repeating steps (e) and (f) until one-third of said core slots have one coil side in the bottom of a slot and the other coil side in the top of the core slot; (h) indexing said core in said direction through an angle equal to the angle between adjacent slots of said core; (i) winding two coils simultaneously with both sides of each coil in the top of the slots overlapping previously wound coil sides; (j) repeating steps (h) and (i) until the remaining two-thirds of said core slots have coil sides in the top thereof; (k) electrically interconnecting the coil sides.

References Cited
UNITED STATES PATENTS

| | | | |
|---|---|---|---|
| 2,835,453 | 5/1958 | Young | 29—155.57 X |
| 2,904,269 | 9/1959 | Eminger | 242—1.1 |
| 2,998,937 | 9/1961 | Potter et al. | 242—1.1 |
| 3,044,150 | 7/1962 | Higley | 242—1.1 |

JOHN F. CAMPBELL, *Primary Examiner.*

R. W. CHURCH, *Assistant Examiner.*